United States Patent Office 3,402,203
Patented Sept. 17, 1968

3,402,203
PROCESS OF PREPARING N,N-DIMETHYL-
AMINO ALCOHOLS
John B. Tindall, Terre Haute, Ind., assignor to
Commercial Solvents Corporation
No Drawing. Filed Nov. 19, 1964, Ser. No. 412,301
17 Claims. (Cl. 260—584)

ABSTRACT OF THE DISCLOSURE

A process for the preparation of N,N-dimethylamino alcohols by replacing each of the hydrogens on the amino nitrogen on the amino alcohol with a methyl radical by reacting the alcohol with at least three mols of formaldehyde per mol of amine. The process also includes the selective production of N,N-dialkylamino alcohols such as N,N-dimethylamino alcohols and isomers thereof utilizing different aldehydes by controlling the reaction mixture to remove formic acid prior to separation of the methylated amino alcohol or to insure the presence of formic acid.

---

The invention relates to a process for the manufacture of N,N-dimethylamino alcohols and to a process for the conversion of, for example, dialkylamino primary and secondary alcohols to dialkylamino secondary and tertiary alcohols.

Heretofore N,N-dialkylamino alcohols such as, for example, 2-dimethylamino-2-methyl-1-propanol, have been prepared by hydrogenating an amino alcohol, e.g. 2-amino-2-methyl-1-propanol in the presence of an aldehyde such as formaldehyde under conditions requiring the use of substantial amounts of hydrogen and Raney nickel catalyst or by refluxing 2-amino-2-methyl-1-propanol and formaldehyde with formic acid. The disadvantages of these prior processes are numerous. For example, when hydrogenating an amino alcohol, large quantities of catalyst are needed. Additionally, the reaction products are solutions containing a low concentration of the desired material which must be further concentrated, and furthermore, the reaction products are mixtures of isomers which are difficult to separate.

This invention has as its object the preparation of N,N-dimethylamino alcohols by a new and improved process. This invention has as a further object the provision of a new and improved process for replacing, by methyl, each of the hydrogens on the amino nitrogen of an amino alcohol. Another object of the present invention is a process whereby N,N-dimethylamino alcohols and isomers thereof may be selectively produced. A still further object is a process for the isomerization of N,N-dialkylamino alcohols, i.e. for the conversion of dialkylamino primary and secondary alcohols to dialkylamino secondary and tertiary alcohols. Another object is the use of available and low-priced raw materials.

The above objects are accomplished by the invention which is described herein with reference to the selective production of 2-dimethylamino-2-methyl-1-propanol and 1-dimethylamino-2-methyl-2-propanol. It is to be understood, however, that the invention is not limited to the production of only these compounds but can be generally used for the production of N,N-dimethylamino alcohols and for the isomerization of N,N-dialkylamino alcohols.

In general, the process of the present invention comprises heating 2-amino-2-methyl-1-propanol and formaldehyde in proportions corresponding to a mol ratio of at least about three mols of formaldehyde for each mol of amine at a temperature and for a period of time sufficient to produce 2-dimethylamino-2-methyl-1-propanol. The net overall reaction is represented by the equation:

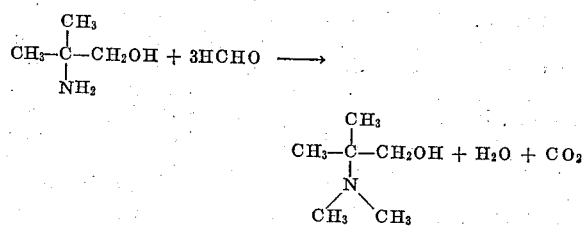

The reaction can, for example, be carried out in an autoclave and the amino alcohol and formaldehyde can be charged directly to the autoclave or premixed before being charged to the autoclave. The components can be added to the autoclave or premixing vessel in any order.

After the reaction is completed, the temperature is lowered and the reaction product is first distilled azeotropically to remove the water produced by the reaction. Then, if the desired product is 2-dimethylamino-2-methyl-1-propanol, the presence of formic acid (which may be produced as a by-product) in the reaction mixture is avoided, for example, by the addition of a strong alkali to neutralize the reaction mixture and the product separated by distillation; whereas, if the desired product is 1-dimethylamino-2-methyl-2-propanol, the presence of formic acid or a formic acid donor in the reaction product prior to distillation is insured and the 2-dimethylamino-2-methyl-1-propanol is converted to 1-dimethylamino-2-methyl-2-propanol by heating and thereafter the desired product is separated.

In addition to formaldehyde, paraformaldehyde and other formaldehyde-releasing substances may be used in the present invention. Also, the aldehyde may, for example, be commercially available formaldehyde which is stabilized with, for example, methanol; however, if methanol is present in the aldehyde, the methanol should be removed by distillation prior to azeotropic distillation of the water. Formaldehyde is used with the amino alcohol in a mol ratio of at least about 3 mols, for instance about 3 to 4 mols, of aldehyde per mol of amine and preferably in a ratio of from about 3.1 to 3.5 mols of aldehyde per mol of amine. 2-mono-methylamino-2-methyl-1-propanol, 4,4-dimethyloxazolidene and 3,4,4-trimethyloxazolidine and their homologues can also be converted to the corresponding dimethylamino alcohols by this process, adjusting for formaldehyde requirements. These compounds are frequently recovered as by-products from the reaction and, accordingly, should be recycled to the reaction.

Reaction temperatures suitable for the present invention are generally from about 80° to 200° C., and preferably temperatures of from about 120 to 160° C. are used. Variations in temperature tend to produce mixtures of isomers of the desired product, as well as by-products including possibly various oxazolidines, 2-monomethylamino-2-methyl-l-propanol, etc., which are difficult to separate from the desired product. The reaction time required is dependent upon the temperature and rectants used. Suitable reaction times are from about 1 to 30 hours and preferably 1 to 20 hours, e.g. about 4 hours with shorter reaction times being required at higher temperatures. Any desirable pressure can be used, for example, from atmospheric to any safe degree, e.g. up to about 300 p.s.i.g., depending upon the equipment used. Pressure is developed at higher temperatures by the evolution of $CO_2$ and venting of the reaction vessel may be required.

Although toluene is the preferred material for use in the azeotropic distillation of water, any compound which does not react with amino alcohols, is capable of forming an azeotrope with water, and may be fractionated from the product without adverse effects to the desired product may be used. Such compounds include, for example, other aromatic compounds such as benzene which forms an azeotrope boiling at about 68° C., alkyls such as hexane and heptane, cycloalkyls such as cyclohexane, lower aliphatic alcohols, e.g. alkanols, such as butanol, etc.

It has been found that the reaction product of the amino alcohol and formaldehyde can contain varying amounts of formic acid which is produced as a by-product of the reaction. The amount of formic acid produced varies with the reaction temperature, larger amounts being produced at lower temperatures. The removal of formic acid prior to distillation to recover the product inhibits the formation of the isomer, e.g. 1-dimethylamino-2-methyl-2-propanol, and allows production of 2-dimethylamino-2-methyl-1-propanol in high yields. To be of any significant value, however, the formic acid must be removed before the autoclave product is distilled. Removal of the formic acid may be accomplished, for example, by vacuum distillation at low temperature, by azeotropic removal of the 2-dimethylamino-2-methyl-1-propanol through distillation with water before the final distillation, or by neutralization of the acid with a strong base such as sodium or potassium hydroxides, carbonates, or bicarbonates. If a strong base is used, it should be added in at least the amount required to neutralize the formic acid present in the reaction product which may be determined by analysis. It has been found that, in general, 0.1% by weight, or more, preferably from about 0.5% to about 5%, by weight of the strong base based on reaction product, i.e. dialkylamino alcohol is required.

If the isomer, e.g. 1-dimethylamino-2-methyl-2-propanol is the desired product, formic acid or a formic acid donor such as formate esters, but not salts, is added to the autoclave product before distillation, and the autoclave product is heated for a period of time and at a temperature sufficient to convert the 2-dimethylamino-2-methyl-1-propanol to 1-dimethylamino-2-methyl-2-propanol. Generally, the formic acid donor is added to the reaction mixture in an amount sufficient to provide in the reaction mixture at least about 0.5%, and preferably about 1% by weight of formic acid based upon the product, i.e. dialkylamino alcohol since with amounts of formic acid below 0.5%, the conversion is too slow to be economical. Although additional formic acid may be used, if desired, amounts above 5% are unnecessary. No particular grade of formic acid donor is required; commercially available products are satisfactory. The length of the heating period in the presence of formic acid required for the conversion to the isomer, e.g. 1-dimethylamino-2-methyl-2-propanol is dependent upon the particular material and the pressure and temperature employed. A convenient way of carrying out this reaction comprises distilling the dimethylamino alcohol and formic acid through a fractionating column and regulating the take off to keep the vapor temperature at essentially the boiling point of the lower boiling isomer. Generally, atmospheric pressure and temperatures of from about 80° to 200° C., preferably from about 120° to 170° C., and times of from about 1 to 45, preferably 1 to 20, hours are suitable. Also, typically, the reaction times are shorter with higher boiling compounds. The reaction temperature can be controlled to an optimum by regulation of the pressure, e.g. by application of a vacuum or superatmospheric pressure as required.

The N,N-dialkylamino alcohols with which the present invention is principally concerned are the dialkylamino alcohols of the general formulae;

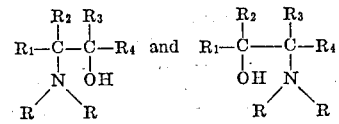

wherein R is a lower alkyl; $R_1$, $R_2$, $R_3$ and $R_4$ are individually selected from the group consisting of hydrogen, alkyl, hydroxyalkyl and phenyl, including phenyl-substituted alkyl and phenyl-substituted hydroxyalkyl. The invention is especially concerned with the production of dimethylamino alcohols of the above formulae wherein R is methyl and with the isomerization of dialkylamino alcohols of the formulae wherein R is lower alkyl. Preferred starting materials include the amino alcohols produced from nitroparaffins, e.g. wherein $R_1$, $R_2$, $R_3$ and $R_4$ in the above formulae have up to about 10 carbon atoms, particularly lower alkyls and hydroxyalkyls. Such N,N-dialkylamino alcohol as, for example, 2-dimethylamino-1-butanol, 1-dimethylamino-2-butanol, 2-dimethylamino-1-pentanol, 1-dimethylamino-2-pentanol, 3-dimethylamino-3-methyl-2-butanol, 2-dimethylamino-3-methyl-3-butanol, 2-dimethylamino-1,3-propanediol, 1-dimethylamino-2,3-propanediol, 1-phenyl-2-dimethylamino-1-propanol, 1-phenyl-1-dimethylamino-2-propanol, etc., can be produced in accordance with the invention.

Generally, N,N-dialkylamino primary alcohols can be readily converted to dialkylamino secondary or tertiary alcohols and dialkylamino secondary alcohols can be converted to dialkylamino tertiary alcohols, etc., by the isomerization process of the present invention. For example, 2-dimethylamino-1-butanol is converted to 1-dimethylamino-2-butanol; 2-dimethylamino-1-pentanol is converted to 1-dimethylamino-2-pentanol; 2-dimethylamino-2-methyl-1-propanol to 1-dimethylamino-2-methyl-2-propanol; 3-dimethylamino-3-methyl-2-butanol to 2-dimethylamino-3-methyl-3-butanol; 2-dimethylamino-1,3-propanediol to 1-dimethylamino-2,3-propanediol; 1-phenyl-2-dimethylamino-1-propanol to 1-phenyl-1-dimethylamino-2-propanol; 2-diethylamino-1-butanol to 1-diethylamino-2-butanol; 2-dibutylamino-1-propanol to 1-dibutylamino-2-propanol; etc.

In order to illustrate specifically the invention, the following examples are given. These examples are merely for purposes of illustration and do not limit the invention in any way.

Examples I–V 2-amino-2-methyl-1-propanol (AMP) and formaldehyde (HCHO) were introduced into a bomb and rocked for 4 hours at the temperatures noted in Table I hereinbelow. The product of the bomb was dehydrated by azeotropic distillation with toluene and fractionated to obtain the desired product 2-dimethylamino-2-methyl-1-propanol (2-DMAM-1-P). The results are tabulated in Table I hereinbelow.

TABLE I

| | Example No. | | | | |
|---|---|---|---|---|---|
| | I | II | III | IV | V |
| Moles AMP | 1.11 | 1.11 | 1.11 | 1.11 | 1.11 |
| Moles HCHO | 3.67 | 3.67 | 3.81 | 3.67 | 3.6 |
| Reaction Temperature, °C | 114–126 | 129–132 | 138–140 | 148–154 | 160–163 |
| Maximum Pressure Developed, p.s.i.g. | 160 | 175 | 255 | 275 | 350 |
| Pressure After Cooling, p.s.i.g. | 75 | 80 | 75 | 150 | 130 |
| Color of Reaction Products | (1) | (2) | (3) | (4) | (5) |
| Weight Loss, $CO_2$, g | 65 | 75 | 66 | 62 | 76 |
| Wt. of Reaction Product, g | 333 | 323 | 333 | 336 | 316 |
| Percent of Original Base in Reaction Product | 86.5 | 89.0 | 85.5 | 90.0 | 87.3 |
| Percent of Original HCHO in Reaction Product | 10.8 | 6.3 | 3.9 | 3.2 | 2.3 |
| Percent Yield of 2-DMAM-1-P | 77.0 | 81.0 | 75.0 | 71.0 | 69.2 |
| Eq. Wt. of Product | 117.6 | 118.0 | 118.2 | 116 | 117.8 |
| HCHO Content of Product, percent | 0.45 | 0.38 | 0.31 | 0.40 | 0.32 |

[1] Light Yellow. [2] Yellow. [3] Light Amber. [4] Amber. [5] Nearly Black.

Examples VI–XVI

Several batches of 2-dimethylamino-2-methyl-1-propanol (2-DMAM-1-P) were prepared by first charging a 37% methanol-stabilized formaldehyde solution into a 100 gallon steel autoclave. A calculated amount of 2-amino-2-methyl-1-propanol (AMP) was then added. The autoclave was closed, the agitator started, and steam pressure put on the autoclave jacket to heat the contents to 150° C. External heat was required to heat the solution to about 120–130° C. and thereafter the heat of reaction carried the temperature to the 150° C. range. The reaction solution was then held four hours at 145–150° C. with agitation. Steam pressure was usually vented off the jacket when the reaction liquid reached the 130–140° C. range. After about the first half hour of reaction, steam was put back on the jacket to hold 145–150° C. In a few cases where the temperature overran 150° C., a flow of cooling water was placed on the jacket for a few minutes. When the reaction temperature reached the 90–120° C. range, pressure in the autoclave rose as carbon dioxide was evolved from the reaction. When the pressure reached 325 p.s.i.g., it was vented back to 275 p.s.i.g.

Table II is a summary of reaction data. In the autoclave reaction mixture 3.2 lb. moles of formaldehyde were added for each lb. mole of AMP. This mixture is 292 pounds of 37% formaldehyde per 100 pounds of AMP. In Examples XIII–XVI, 3.2 moles of HCHO per mole of AMP were charged plus additional formaldehyde added on the basis of one mole of formaldehyde per mole of 2-monomethylamino-2-methyl-1-propanol (MMAMP).

The aqueous solution of autoclave effluent was charged to a 600-gallon batch kettle. 2-DMAM-1-P was recovered by fractionation of the autoclave product in an 18 inch diameter 40 plate pilot plant column. Autoclave effluent was about 8% MeOH, 50% water, 32% 2-DMAM-1-P and the balance unreacted or partially reacted raw materials and reaction by-products. Examples XIII–XVI using Peoria heads for reaction raw materials contained less water and methanol because less formaldehyde was needed per batch. This resulted from the high 2-DMAM-1-P and MMAMP content of the Peoria heads.

The distillation was run in the following manner: A methanol cut was taken at 1:1 reflux ratio and atmospheric pressure to 66° C. top temperature. The reflux ratio was changed to 2:1 and takeoff continued to 75° on the top tray. Care was taken at this time to remove methanol from the system because it would prevent phase separation of toluene and water for decantation. Toluene was then added to the kettle and a toluene-water azeotrope distilled out at 82 to 86° C. and total takeoff. The water layer was decanted off and discarded and the toluene layer was returned to the kettle. When water removal was nearly complete, the boilup rate slowed and temperatures in the lower part of the column began rising. When the top temperature reached 95° C. the water was all out. Heads cuts from previous distillation were added and the column was set on total reflux and the pressure slowly lowered to 100 mm. Hg absolute pressure. The toluene cut was then taken at total takeoff to 65° C. top temperature.

The reflux ratio was set at 5:1 and heads cuts were taken at 100 mm. Hg to 95° C. top temperature. These cuts were assayed by gas chromatograph for relative DMAMP, isomer and oxazolidine contents. This assay determined the disposition of heads cuts to discard, recycle to next distillation, or addition to finished product blends.

The reflux ratio was then droped back to 1:1 and 2-DMAM-1-P product was taken out in 55-gallon composite cuts at 100 mm. The top temperature usually peaked at about 98 or 99° C. and then fell back toward the end as a boilup decreased. Product cuts were continued until distillate rate decreased to nothing with full steam pressure of 120 p.s.i.g. on the reboiler. An analysis of the product cuts for Example XI was as follows:

| 2-DMAM-1-P, percent | 98.6 |
| Isomer, percent | 0.42 |
| 3,4,4-trimethyl oxazolidine, percent | 0.18 |
| 4,4-dimethyl oxazolidine, percent | 0.42 |
| $H_2O$, percent | 0.35 |
| Color—APHA | 5 |

Table III shows that reaction yields using pure AMP were in the 80% range. 1% KOH based on the reaction product was added prior to the distillation to illustrate the effectiveness of a strong alkali in reducing isomer production.

TABLE II

| | \multicolumn{11}{c}{Example No.} |
| | VI | VII | VIII | IX | X | XI | XII | XIII | XIV | XV | XVI |
|---|---|---|---|---|---|---|---|---|---|---|---|
| HCHO (lbs.) | 314 | 485 | 2,425 | 647 | 600 | 7,200 | 2,040 | 412 | 124 | 541 | 425 |
| AMP (lbs.) | 106 | 165 | 825 | 220 | 198 | 2,376 | 669 | 135 | 9 | 165 | 126 |
| MMAMP (lbs.) | | | | | | | | 80 | 67 | 94 | 70 |
| 2-DMAM-1-P (lbs.) | | | | | | | | 195 | 375 | | |
| Time, apprx. hr | 6 | 4 | 4 | 5 | 4 | 4 | 4 | 5 | 5 | 4 | 4 |
| Temp., °C | 126–136 | 147–153 | 147–153 | 147–148 | 148–156 | 148–152 | 148–152 | 148–150 | 146–151 | 148–150 | 148–150 |

TABLE III.—AUTOCLAVE REACTION YIELDS BASED ON SAMPLE RECOVERY

| | \multicolumn{7}{c}{Example} |
| | VII | VIII–XI | XII | XIII | XIV | XV | XVI |
|---|---|---|---|---|---|---|---|
| Type Raw Material | AMP | AMP | AMP | | Mixture | | |
| No KOH in Distillation: | | | | | | | |
| Percent 2-DMAM-1-P | 30.4 | 26.1 | 30.5 | 41.1 | 61.4 | 36.5 | 36.1 |
| Percent Isomer | 0.7 | 5.4 | 2.7 | | 2.2 | 0.2 | 0.3 |
| Yield, Percent | 86 | 69.7 | 84.3 | 76.3 | 86.1 | 76.0 | 74.1 |
| With KOH in Distillation: | | | | | | | |
| Percent 2-DMAM-1-P | | 32.4 | 32.6 | | | | |
| Percent Isomer | | 0.4 | 0.4 | | | | |
| Yield, Percent | | 86.7 | 900 | | | | |

Example XVII (A–C)

(A) To illustrate the conversion of 2-dimethylamino-2-methyl-1-propanol (2-DMAM-1-P) to 1-dimethylamino-2-methyl-2-propanol (1-DMAM-2-P), a mixture of 109 g. of 2-DMAM-1-P (95.5%), 100 ml. of H₂O, 1 ml. of 88% HCOOH and 100 ml. toluene was distilled through a column, freed from water, then fractionated. The fractions analyzed as follows:

| Cut No. | Temp. (°C.) | Weight (grams) | 2-DMAM-1-P | 1-DMAM-2-P |
|---|---|---|---|---|
| 1 | 110–115 | (Toluene—discarded) | | |
| 2 | 115–129 | 6 | 0.1 | 42 |
| 3 | 129–133 | 63 | 2.2 | 96 |
| 4 | 133–150 | 15.5 | 27 | 70 |
| 5 | Residue | 20.7 | 86 | 3.5 |

Yield of 1-dimethylamino-2-methyl-2-propanol is 70%.

(B) 2-dimethylamino-1-butanol when distilled with 3 wt. percent formic acid gave a 44% conversion to 1-dimethylamino-2-butanol in eight hours. The liquid temperature remained at 168–170° C. while the vapor temperature was 146–148° C.

(C) When 2-dimethylamino-1-propanol was distilled as in Example XVII (B), the conversion to 1-dimethylamino-2-propanol was 39% in 24 hours. The liquid temperature was 150° ±1% at all times while the vapor temperature was held at 125–130° C.

Example XVIII

Seven autoclave batches of the reaction product obtained by reacting 2-amino-2-methyl-1-propanol (AMP) with formaldehyde in accordance with the procedure of Examples VI–XVI having varying amounts of formic acid present in the reaction mixture were treated for conversion of the 2-DMAM-1-P to its isomer. The results are tabulated below:

| Batch No. | Autoclave Temp., °C. | Percent Formic Acid in Reaction Mixture | Percent 2-DMAM-1-P | Percent 1-DMAM-2-P |
|---|---|---|---|---|
| 1 | 127–133 | 0.91 |  | 89 |
| 2 | 128–132 | 1.03 | 25 | 73 |
| 3 | 127–132 | 1.41 | 16 | 73 |
| 4 | 129–135 | 1.0 | 35 | 50 |
| 5 | 150 | 0.5 | 84.5 | 5.3 |
| 6 | 150–154 | 0.2 | 90.5 |  |
| 7 | 149–151 | 0.05 | 86 | (¹) |

¹ Nil.

Example XIX

AMP and formaldehyde are reacted in accordance with the process of Examples VI–XVI and the 2-DMAM-1-P converted to 1-DMAM-2-P without isolation by the addition of formic acid with subsequent heating.

Example XX

The procedure of Examples VI–XVI is followed with the following materials to produce the products listed:

| Aminoalcohol | Aldehyde | Product |
|---|---|---|
| 2-amino-1-butanol | Paraformaldehyde | 2-dimethylamino-1-butanol. |
| 2-amino-1-pentanol | Formaldehyde | 2-dimethylamino-1-pentanol. |
| 2-amino-2-methyl-1-hexanol | do | 2-dimethylamino-2-methyl-1-hexanol. |
| 2-amino-1-nonanol | do | 2-dimethylamino-1-nonanol. |
| 2-amino-1-decanol | do | 2-dimethylamino-1-decanol. |
| 3-amino-2-methyl-2-butanol | do | 3-dimethylamino-3-methyl-2-butanol. |
| 2-amino-1,3-propanediol | Paraformaldehyde | 2-dimethylamino-1,3-propanediol. |
| 2-amino-1-phenyl-1-propanol | Formaldehyde | 1-phenyl-2-dimethylamino-1-propanol. |
| 3-phenyl-2-amino-1-butanol | do | 3-phenyl-2-dimethylamino-1-butanol. |
| 2-amino-2-hydroxymethyl-1-propanol | do | 2-dimethylamino-2-hydroxymethyl-1-propanol. |

Example XXI

The procedure of Example XVII is followed to convert the following aminoalcohols to the isomer:

| Primary or secondary alcohol | Converted to, respectively—Secondary or tertiary alcohol |
|---|---|
| 2-dimethylamino-1-butanol | 1-dimethylamino-2-butanol. |
| 2-dimethylamino-1-pentanol | 1-dimethylamino-2-pentanol. |
| 2-dimethylamino-2-methyl-1-hexanol | 1-dimethylamino-2-methyl-2-hexanol. |
| 2-dimethylamino-1-nonanol | 1-dimethylamino-2-nonanol. |
| 2-dimethylamino-1-decanol | 1-dimethylamino-2-decanol. |
| 3-dimethylamino-3-methyl-2-butanol | 2-dimethylamino-3-methyl-3-butanol. |
| 2-dimethylamino-1,3-propanediol | 1-dimethylamino-2,3-propanediol. |
| 1-phenyl-2-dimethylamino-1-propanol | 1-phenyl-1-dimethylamino-2-propanol. |
| 2-diethylamino-1-pentanol | 1-diethylamino-2-pentanol. |
| 2-dibutylamino-1-propanol | 1-dibutylamino-2-propanol. |
| 2-diamylamino-1-propanol | 1-diamylamino-2-propanol. |
| 3-phenyl-2-dimethylamino-1-butanol | 3-phenyl-1-dimethylamino-2-butanol. |
| 2-dimethylamino-2-hydroxymethyl-1-propanol | 1-dimethyamino-2-hydroxymethyl-2-propanol. |

It is claimed:

1. A method for the production of N,N-dimethylamino alcohols consisting essentially of heating an amino alcohol represented by the formula:

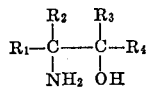

wherein $R_1$, $R_2$, $R_3$ and $R_4$ are individually selected from the group consisting of hydrogen, alkyl, hydroxyalkyl and phenyl with formaldehyde in a mol ratio of at least about 3 mols of aldehyde per mol of amine at a temperature of from about 80° to about 200° C. for a period of time sufficient to produce the N,N-dimethylamino alcohol corresponding to said amino alcohol and thereafter separating the N,N-dimethylamino alcohol from the reaction mixture.

2. The method of claim 1 wherein said temperature is from about 120° to about 160° C.

3. The method of claim 1 wherein said N,N-dimethylamino alcohol is separated by distillation.

4. The method of claim 1 wherein said mol ratio is from about 3.1 to 3.5 mols of formaldehyde per mol of amine.

5. The method of claim 4 wherein said temperature is from about 120° to about 160° C. and said time is from about 1 to 20 hours.

6. A method for the production of N,N-dimethylamino alcohols represented by the formula:

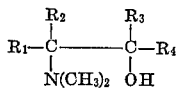

wherein $R_1$, $R_2$, $R_3$ and $R_4$ are individually selected from the group consisting of hydrogen, alkyl, hydroxyalkyl and phenyl, consisting essentially of heating an amino alcohol represented by the formula:

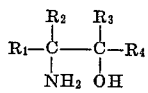

wherein $R_1$, $R_2$, $R_3$ and $R_4$ have the above-designated meanings, with formaldehyde in a mol ratio of at least about 3 mols of aldehyde per mol of amine at a temperature of from about 80° to about 200° C. for a period of time sufficient to produce said N,N-dimethylamino alcohol, removing formic acid present in the reaction mixture, and thereafter separating said N,N-dimethylamino alcohol from the reaction mixture by distillation.

7. The method of claim 6 wherein the formic acid is effectively removed by neutralization thereof with a strong base.

8. The method of claim 6 wherein said amino alcohol is 2-amino-2-methyl-1-propanol and said N,N-dialkylamino alcohol is 2-dialkylamino-2-methyl-1-propanol.

9. A method for the production of an N,N-dimethyl amino alcohol represented by the formula:

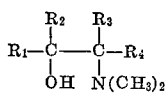

wherein $R_1$, $R_2$, $R_3$ and $R_4$ are individually selected from the group consisting of hydrogen, alkyl, hydroxyalkyl and phenyl, consisting essentially of reacting an amino alcohol of the general formula:

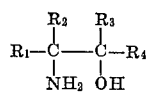

wherein $R_1$, $R_2$, $R_3$ and $R_4$ have the above meanings, with formaldehyde in a mol ratio of at least about 3 mols of aldehyde per mol of amine at a temperature of from about 80° to about 200° C. for a period of time sufficient to produce a reaction mixture containing a compound of the general formula:

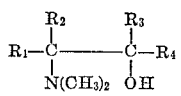

wherein $R_1$, $R_2$, $R_3$ and $R_4$ have the above meanings, adding a sufficient amount of a formic acid donor to said reaction mixture to provide at least about 0.5% by weight formic acid in said mixture based on said compound and heating the said mixture at a temperature and for a period of time sufficient to convert said compound to said N,N-dimethylamino alcohol.

10. The method of claim 9 wherein said formic acid is present in amounts of from about 1 to 5% by weight based on the weight of the compound.

11. The method of claim 9 wherein said amino alcohol is 2-amino-2-methyl-1-propanol, said compound is 2-dimethylamino - 2 - methyl-1-propanol and said dimethylamino alcohol is 1-dimethylamino-2-methyl-2-propanol.

12. The method of claim 9 where the temperature and time for said reaction of the aminoalcohol and aldehyde are, respectively, from about 120° to 160° C. and from about 1 to 20 hours.

13. The method of claim 12 wherein said temperature and time for the conversion of said compound to said N,N-dimethylamino alcohol are, respectively, from about 80° to 200° C. and from about 1 to 40 hours.

14. A method of converting a first dialkylamino alcohol of the general formula:

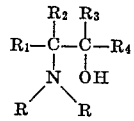

to a second dialkylamino alcohol of the general formula:

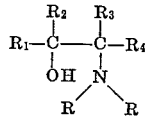

wherein R is lower alkyl and $R_1$, $R_2$, $R_3$ and $R_4$ are individually selected from the group consisting of hydrogen, alkyl, hydroxyalkyl and phenyl, comprising heating said first dialkylamino alcohol in the presence of at least about 0.5% by weight of a formic acid donor based on the weight of said first dialkylamino alcohol for a period of time and at a temperature sufficient to convert said first dialkylamino alcohol to said second dialkylamino alcohol.

15. The method of claim 14 wherein said temperature is from about 80° to 200° C. and said time is from about 40 to 1 hours.

16. The method of claim 14 wherein said temperature is from about 120° to 160° C. and said time is from about 20 to 1 hours.

17. In a method for the production of N,N-dialkylamino alcohols represented by the formula:

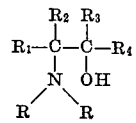

wherein R is lower alkyl and $R_1$, $R_2$, $R_3$ and $R_4$ are individually selected from the group consisting of hydrogen, alkyl, hydroxyalkyl and phenyl, comprising reacting an amino alcohol with an aldehyde and thereafter separating said N,N-dialkylamino alcohol from the resulting reaction mixture, the improvement of a method for reducing the production of isomer compounds of said dialkylamino alcohols comprising adding a sufficient amount of a strong base to said reaction mixture prior to said separation to neutralize the formic acid present therein and thereafter separating said N,N-dialkylamino alcohol from the reaction mixture by distillation.

References Cited

UNITED STATES PATENTS 3,091,640   5/1963   Seeger et al. ___ 260—570.6 XR

OTHER REFERENCES

Eschweiler: Ber. Deut. Chem., vol. 38, pp. 880–882 (1905).

FLOYD D. HIGEL, *Primary Examiner.*